Figure 1:
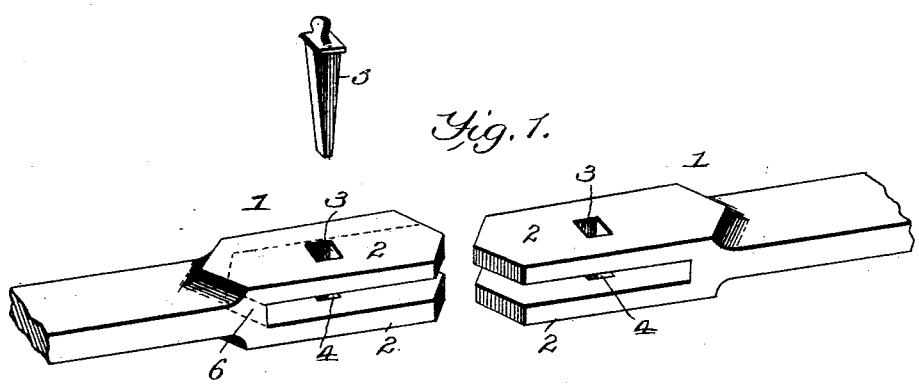
Figure 2:
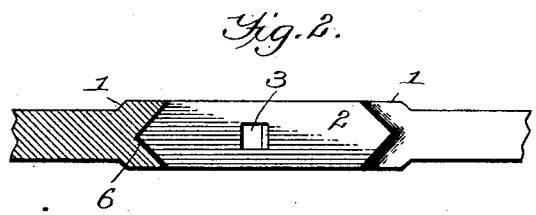
Figure 3:
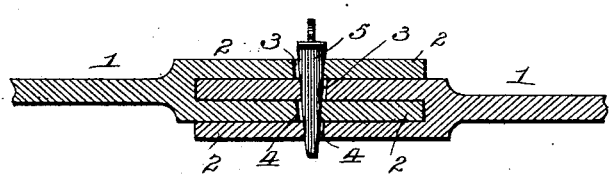
Figure 4:
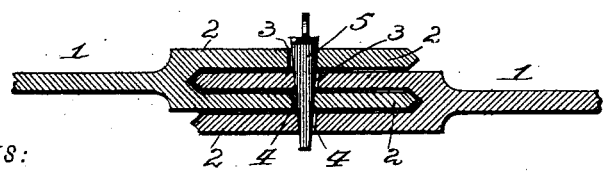

(No Model.)

W. H. CARTER.
CAR COUPLING.

No. 580,122. Patented Apr. 6, 1897.

WITNESSES:
Harry S. Rohrer
Herbert Bradley

United States Patent Office.
WILLIAM H. CARTER, OF CHICAGO, ILLINOIS.
CAR-COUPLING.

INVENTOR
William H. Carter,
BY
Knight Bros
ATTORNEY.